No. 626,837. Patented June 13, 1899.
G. LEECOCK.
SELF LUBRICATING PULLEY.
(Application filed Aug. 31, 1898.)
(No Model.)
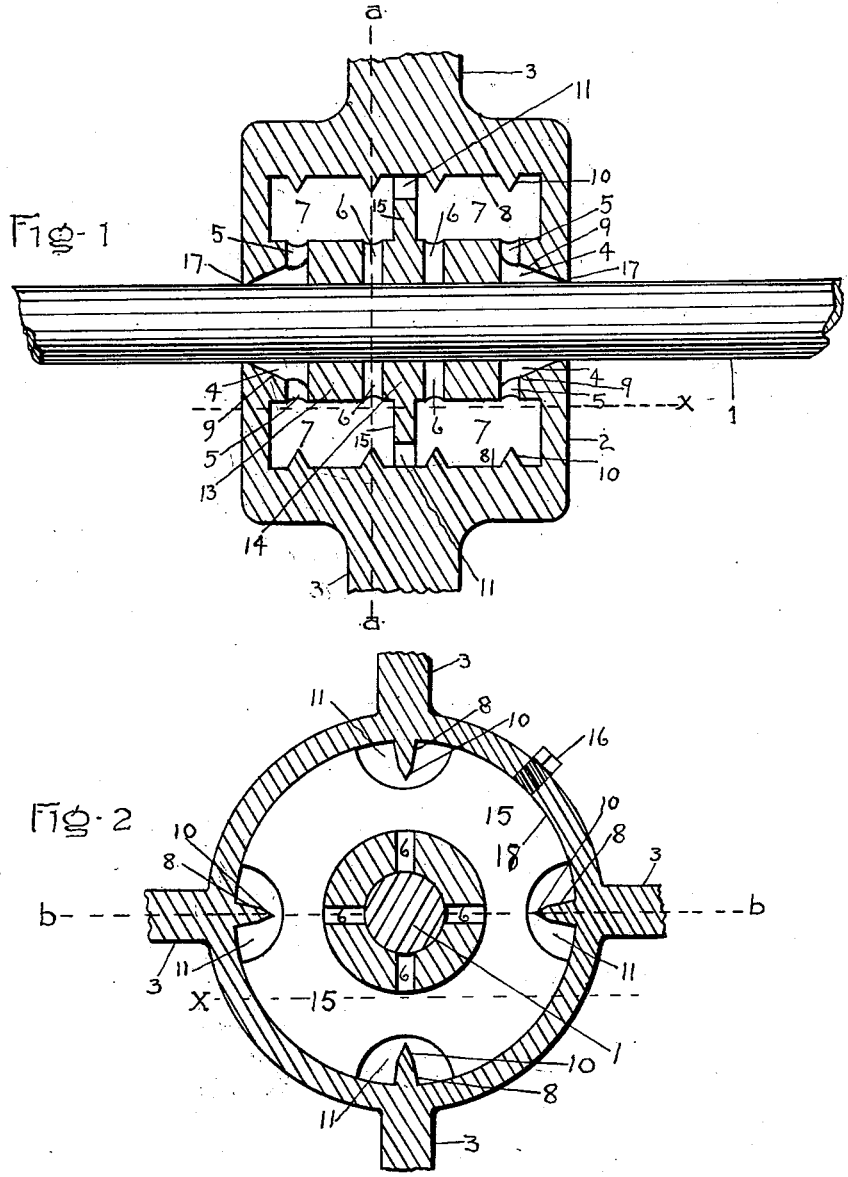
WITNESSES
Chas. V. Burgess
Wm. L. Baker
INVENTOR
GEORGE LEECOCK
By his ATTORNEY
Louis H. Hermann

UNITED STATES PATENT OFFICE.

GEORGE LEECOCK, OF NORTH ANDOVER, MASSACHUSETTS, ASSIGNOR OF ONE-HALF TO THOMAS O'BRIEN, OF LAWRENCE, MASSACHUSETTS.

SELF-LUBRICATING PULLEY.

SPECIFICATION forming part of Letters Patent No. 626,837, dated June 13, 1899.

Application filed August 31, 1898. Serial No. 689,965. (No model.)

*To all whom it may concern:*

Be it known that I, GEORGE LEECOCK, a citizen of the United States, and a resident of North Andover, in the county of Essex and State of Massachusetts, have invented certain new and useful Improvements in Self-Lubricating Loose Pulleys, of which the following is a specification.

The object of my invention is to provide a cheaply-made self-lubricating loose pulley in which the oil will be retained with no liability of dripping and which will run for a long time without attention.

According to my invention I provide the hub of the pulley with an enlarged annular oil-chamber and two small annular chambers or grooves in the shaft-bore at each end thereof, said grooves having inclined sides and being connected with the enlarged oil-chamber first mentioned. I cast the pulley in one piece, coring out the oil-chamber and oil-passages, so but little more machine-work is necessary after the pulley is cast than is needful for finishing up an ordinary pulley. For these reasons my pulley can be made almost as cheaply as the ordinary pulley.

For a more complete disclosure of the invention reference is made to the accompanying drawings, in which—

Figure 1 is a cross-section on the line *b b* of Fig. 2. Fig. 2 is a cross-section on the line *a* of Fig. 1.

1 indicates the shaft, 2 the hub of the pulley, provided with a central bore therefor, and 3 the pulley-arms. Near the ends of the hub are small annular chambers or grooves 4 4, extending from the shaft-bore and having inclined walls 9 9 diverging from points near the ends of the hub, short bearing portions between the ends of the walls 9 9 and the ends of the hub being provided. These grooves 4 4 may be easily cut out while the pulley is being finished in the lathe. Passages 5 5 connect the chambers 4 4 with the large annular oil-chamber 7, which chamber extends the entire distance between the end walls of the hub. Two additional sets of oil-passages 6 6 are located near to and on opposite sides of the center of the chamber 7. The outer internal wall of chamber 7 is provided with straight inwardly-extending ribs 8 8, which extend the entire length of chamber 7 and are located opposite each row of oil-passages 5 and 6, as shown, and directly opposite each of said oil-passages, on the inner sides of said ribs, are conical or tapered projections 10 10. I provide also a web 15, which connects the bearing portion 14 with the outer wall of the chamber 7, said web being arranged centrally of said chamber and between the double row of oil-passages 6 6. Openings 11 through web 15 connect the ends of chamber 7, said ribs 8 8 extending through said openings 11. A filling-plug 16 may be located at any desired point.

The operation of my device is as follows: The chamber 7 is filled with oil up to about the dotted line X. As the pulley is started the oil will be spattered or thrown by the ribs 8 upon the bearing portion 13 and will enter the oil-passages 5 and 6. The oil after entering the passages 6 6 will work along the shaft toward the ends of the hub to the chambers 4 4. When the oil reaches the point 17 at the outer ends of said chambers 4 4, it will not pass beyond, but will be transferred to the inclined walls 9 9, and the centrifugal force generated by the rapidly-rotating pulley will cause it to spread over and flow up and along the walls 9 and out of the passages 5 5, from which points the oil will be discharged into the chamber 7. When the pulley is at rest, the oil in chambers 4 4 will flow down the inclined walls 9 9 of the lower halves of the chambers 4 4 out of the holes 5, as is obvious. When the pulley is rotated rapidly, the centrifugal force will cause the oil to spread over the entire surface 18 of the chamber 7, and if this surface were left smooth little oil would fall into the oil-holes. The ribs 8, however, break up the oil and throw it onto the bearing portion and into the oil-holes. These ribs are particularly effective when there is any sudden variation in the speed of the pulley or when it is running slowly. The projections 10 and web 15 also materially assist in spattering the oil. When the pulley is at rest or rotating slowly, the oil will drop from the projections 10 either directly into the oil-passages 5 and 6 or onto the surface of the bearings adjacent thereto and then run down into said passages and lubricate the bearing. The oil flowing into the passages 6 6 will also lubricate the bearing portion 14, as will be obvious.

The web 15, in addition to performing the function of breaking up and spattering the oil, strengthens the hollow hub, making it nearly as strong as a solid hub of the same diameter.

It will be observed that the pulley has a bearing the entire length of the hub with the exception of the small space occupied by the chambers or grooves 4 4.

As the oil-chamber is wholly inclosed there is no chance for dust to get into the bearing, and the above-described pulley is for this reason particularly well adapted for a mill or factory where there is considerable dust.

Having described my invention, what I claim as new, and desire to secure by Letters Patent of the United States, is as follows:

A loose pulley having the hub thereof provided with a central shaft-bore, annular grooves or chambers extending from said bore near the ends thereof, an inclosed annular chamber 7 located in said hub and extending longitudinally from end to end thereof, passages 5 connecting said annular grooves with the outer ends of said chamber, intermediate oil-passages 6 connecting said chamber with the shaft-bore, said passages 5 and 6 being arranged in rows, each row being in substantially the same plane; straight ribs 8, extending the entire length of the outer internal wall of said chamber and inwardly a portion of the width of the chamber in the radial planes of said oil-passages; projections 10 on the inner edges of said ribs, each projection being located in a radial central line of said oil-passages.

In testimony whereof I have affixed my signature in presence of two witnesses.

GEORGE LEECOCK.

Witnesses:
 LOUIS H. HARRIMAN,
 THOMAS O'BRIEN.